(12) United States Patent
Akizuki

(10) Patent No.: US 6,360,004 B1
(45) Date of Patent: Mar. 19, 2002

(54) TOUCH PAD HAVING FINGERPRINT DETECTING FUNCTION AND INFORMATION PROCESSING APPARATUS EMPLOYING THE SAME

(75) Inventor: Satoru Akizuki, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/221,597

(22) Filed: Dec. 29, 1998

(30) Foreign Application Priority Data

Mar. 26, 1998 (JP) .......................................... P10-79057

(51) Int. Cl.[7] .............................................. G06K 9/00
(52) U.S. Cl. ...................................... 382/124; 340/5.74
(58) Field of Search ................................ 382/115, 124, 382/125; 235/380, 492; 902/3, 4, 25; 340/825.3, 825.34; 283/68; 356/71; 705/1, 26, 42; 704/246, 273

(56) References Cited

U.S. PATENT DOCUMENTS

| | | | | |
|---|---|---|---|---|
| 5,420,936 A | * | 5/1995 | Fitzpatrick et al. | ......... 382/124 |
| 5,635,723 A | * | 6/1997 | Fujieda et al. | ............... 250/556 |
| 5,838,306 A | * | 11/1998 | O'Conner et al. | ........... 345/163 |
| 5,848,231 A | * | 12/1998 | Teitelbaum et al. | ......... 395/186 |
| 5,991,431 A | * | 11/1999 | Borza et al. | ................. 382/127 |

FOREIGN PATENT DOCUMENTS

| | | |
|---|---|---|
| JP | 4-158434 | 6/1992 |
| JP | 04-158434 | * 6/1992 |
| JP | 7-129049 | 5/1995 |

* cited by examiner

Primary Examiner—Samir Ahmed
(74) Attorney, Agent, or Firm—Wenderoth, Lind & Ponack, L.L.P.

(57) ABSTRACT

A touch pad comprising: a fingerprint and position sensor which acts not only as a fingerprint sensor for detecting a fingerprint of a finger but as a position sensor for detecting a position of contact of the finger with the position sensor; a processor for processing an output from the fingerprint and position sensor; and a fingerprint detection and touch pad controller for controlling the fingerprint and position sensor and the processor; wherein the processor selectively outputs one of fingerprint detection data and positional detection data to an information processing apparatus as an input from the finger.

2 Claims, 2 Drawing Sheets

TOUCH PAD HAVING FINGERPRINT DETECTING FUNCTION AND INFORMATION PROCESSING APPARATUS EMPLOYING THE SAME

BACKGROUND OF THE INVENTION

1. Field of the Invention

The present invention relates to an input device for inputting positional information and fingerprint information to an information processing apparatus.

2. Description of the Prior Art

Conventionally, in order to protect confidential information recorded in an information processing apparatus, a method of detecting a fingerprint of an operator has been employed as a means for identifying individuals more positively. In case the information processing apparatus has a fingerprint detecting function, a dedicated fingerprint detector generally should be either incorporated in the information processing apparatus or provided outside the information processing apparatus so as to be connected thereto.

FIG. 2 shows a configuration of a conventional information processing apparatus including a host computer 15, a fingerprint detecting unit 14 for detecting fingerprints and a touch pad unit 24 for inputting positional information so as to act as a mouse for displacing a cursor on a screen. As shown in FIG. 2, in the known information processing apparatus, the fingerprint detecting unit 14 and the touch pad unit 24 are provided entirely independently of each other and are connected to the host computer 15 such that the host computer 15 not only controls each of the fingerprint detecting unit 14 and the touch pad unit 24 but processes information from each of the fingerprint detecting unit 14 and the touch pad unit 24.

The fingerprint detecting unit 14 is constituted by a fingerprint sensor 11 for detecting a fingerprint from a depressed finger of each of operator, a fingerprint detection controller 12 which receives a fingerprint detection control signal CS1 from the host computer 15 and generates a control signal for causing the fingerprint sensor 11 to send out a detection signal, and a fingerprint detection signal processor 13 for outputting to the host computer 15 the detection signal delivered from the fingerprint sensor 11, as a fingerprint detection signal DS1 of the operator.

Meanwhile, the touch pad unit 24 is constituted by a position sensor 21 for detecting a position of contact of the finger of the operator with the position sensor 21, a touch pad controller 22 which receives a touch pad control signal CS2 from the host computer 15 and produces a further control signal for causing the position sensor 21 to transmit a further detection signal, and a positional detection signal processor 23 for outputting to the host computer 15 the further detection signal issued from the position sensor 21, as a positional detection signal DS2.

The host computer 15 compares the fingerprint detection signal DS1 delivered from the fingerprint detection unit 14, with stored fingerprint data so as to discriminate whether or not the operator is a specific individual and receives the positional detection signal DS2 from the touch pad unit 24 so as to perform such information processings as displacing the cursor to coordinates on the screen corresponding to the positional detection signal DS2.

However, in the prior art information processing apparatus including the fingerprint detection unit 14 and the touch pad unit 24 as described above, since the operator should actually contact the two similar sensors 11 and 21, there is a risk that the operator may contact each of the sensors 11 and 21 for a wrong purpose.

Furthermore, in case the known information processing apparatus is made portable, the two sensors 11 and 21 constitute an obstacle to achievement of making the known information processing apparatus compact, light and inexpensive.

SUMMARY OF THE INVENTION

Accordingly, an essential object of the present invention is to provide a touch pad having a fingerprint detecting function, which eliminates such a conventional risk that an operator may contact each of two sensors for a wrong purpose.

Another important object of the present invention is to provide an information processing apparatus employing the touch pad, which can be made compact, light and inexpensive so as to be suitable for portable use.

In order to accomplish these objects of the present invention, the touch pad of the present invention is characterized in that a single sensor acts not only as a fingerprint sensor but as a position sensor. Namely, a touch pad according to one embodiment of the present invention comprises: a fingerprint and position sensor which acts not only as a fingerprint sensor for detecting a fingerprint of a finger but as a position sensor for detecting a position of contact of the finger with the position sensor; a processor for processing an output from the fingerprint and position sensor; and a fingerprint detection and touch pad controller for controlling the fingerprint and position sensor and the processor; wherein the processor selectively outputs one of fingerprint detection data and positional detection data to an information processing apparatus as an input from the finger.

BRIEF DESCRIPTION OF THE DRAWINGS

These objects and features of the present invention will become apparent from the following description taken in conjunction with the preferred embodiment thereof with reference to the accompanying drawings in which.

DETAILED DESCRIPTION OF THE INVENTION

Figure 1:
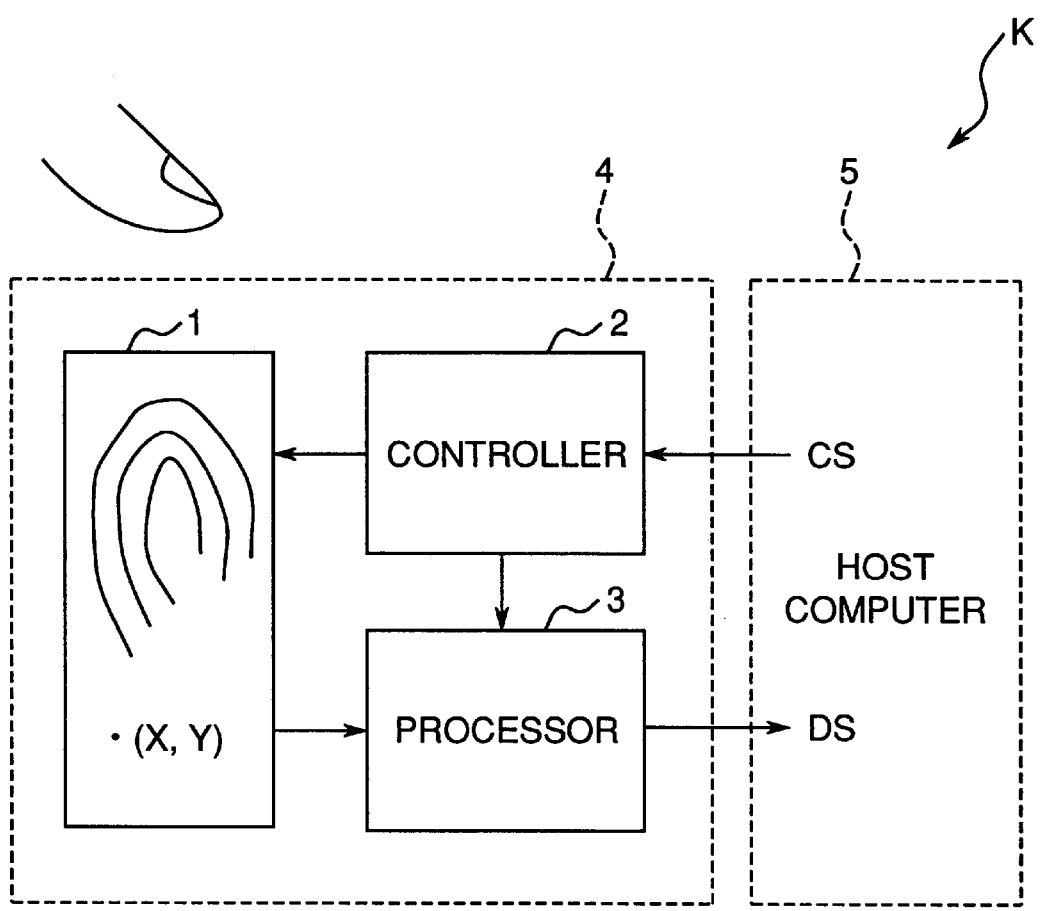
FIG. 1 is a diagram showing a configuration of an information processing apparatus including a touch pad having a fingerprint detecting function, according to one embodiment of the present invention.
Figure 2:
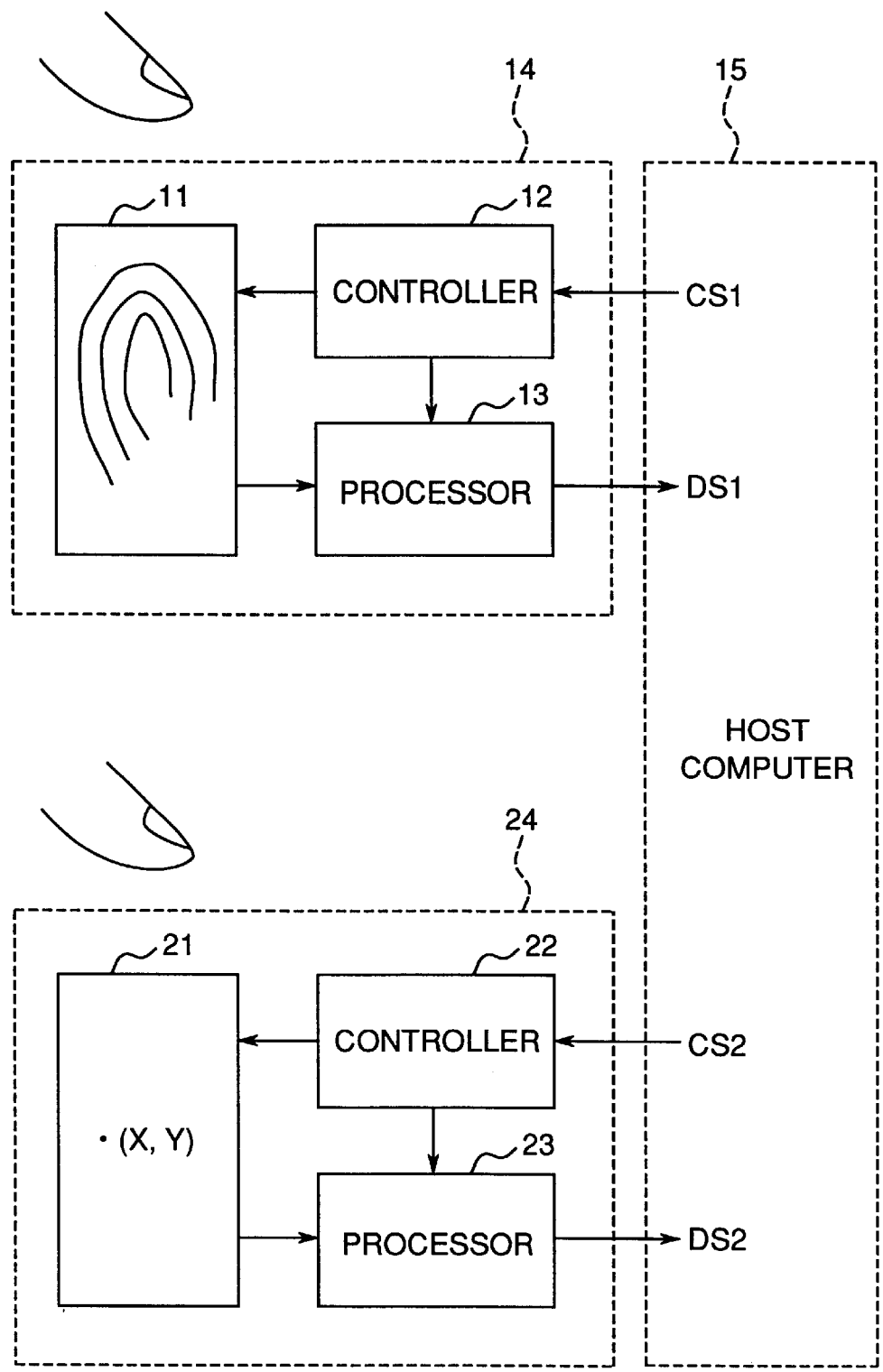
FIG. 2 is a diagram showing a configuration of a prior art information processing apparatus including a fingerprint detecting unit and a touch pad unit (already referred to).

FIG. 1 shows a configuration of an information processing apparatus K according to one embodiment of the present invention. The information processing apparatus K includes a host computer 5 and a touch pad 4 having a fingerprint detecting function. The touch pad 4 is constituted by a fingerprint and position sensor 1, a fingerprint detection and touch pad controller 2, and a processor 3 for processing a fingerprint and positional detection signal from the fingerprint and position sensor 1.

In electrostatic capacity type or resistance type touch pads in actual use at present, resolutions of sensors are generally 100 $\mu$m (10 dots/mm) approximately. However, in the information processing apparatus K, resolution of the fingerprint and position sensor 1 is raised to not less than about 50 $\mu$m (20 dots/mm) required for detecting peaks and valleys of fingerprints, the fingerprint and position sensor 1 can act not only as a fingerprint sensor but as a position sensor.

In a fingerprint detection mode of the touch pad 4, the fingerprint and position sensor 1 detects contacted surface of a finger of each operator microscopically and the processor 3 outputs to the host computer 5 image data corresponding to presence or absence of contact of each of uneven portions of the fingerprint with the fingerprint and position sensor 1, as fingerprint information. Meanwhile, in a positional detection mode of the touch pad 4, the fingerprint and position sensor 1 detects contacted surface of the finger of the operator macroscopically so as to recognize the whole contacted surface of the finger as one contact object and the processor 3 outputs to the host computer 5 data of a position that is close to a center of the contact object, as coordinates information. The fingerprint and position sensor 1 detects state of the finger of the operator held in contact therewith and outputs to the processor 3 the detection signal as the fingerprint information in the fingerprint detection mode and as the coordinates information in the positional detection mode in accordance with the operational modes determined by the fingerprint detection and touch pad controller 2.

In response to a fingerprint and positional detection control signal CS from the host computer 5, the fingerprint detection and touch pad controller 2 determines one of the fingerprint detection mode and the positional detection mode and informs the fingerprint and position sensor 1 and the processor 3 of the determined one of the fingerprint detection mode and the positional detection mode. Meanwhile, the fingerprint detection and touch pad controller 2 produces a timing control signal for synchronizing detection of the fingerprint and position sensor 1 with signal processing of the processor 3.

The processor 3 receives the detection signal from the fingerprint and position sensor 1 and outputs a detection signal DS to the host computer 5 in accordance with the operational modes, i.e. outputs the fingerprint information, as a fingerprint detection signal, to the host computer 5 in the fingerprint detection mode and outputs the coordinates information, as a positional detection signal, to the host computer 5 in the positional detection mode.

In the fingerprint detection mode of the touch pad 4, the host computer 5 compares the fingerprint detection signal delivered from the touch pad 4, with stored fingerprint data so as to discriminate whether or not the operator is a specific individual. Meanwhile, in the positional detection mode of the touch pad 4, the host computer 5 receives the positional detection signal from the touch pad 4 and performs such processings as displacing a cursor to coordinates on a screen corresponding to the positional detection signal.

As is clear from the foregoing description of the present invention, since the touch pad having the fingerprint detecting function saves the conventional need for provision of a separate fingerprint detecting unit, such a hitherto incurred risk that the operator may contact each of two sensors for a wrong purpose can be eliminated and the information processing apparatus incorporating the touch pad can be made compact, light and inexpensive so as to be suitable for portable use.

Furthermore, in accordance with the present invention, each time the operator contacts the touch pad, the fingerprint of the operator can be detected so as to judge whether or not subsequent input by the operator is permissible such that the operator permitted to contact the touch pad is limited to the specific individual, thereby resulting in improvement of confidential retention function.

What is claimed is:

1. A touch pad, for use with an information processing apparatus, said touch pad comprising:

a sensor operable to detect a fingerprint pattern of a finger, and X-axis and Y-axis coordinates of a position of contact of the finger with said sensor, wherein said sensor is an electrostatic capacity sensor or a resistance sensor;

a processor communicatively connected to said sensor in such a manner as to enable communication of information between said sensor and said processor, said processor operable to processes the fingerprint pattern and the X-axis and Y-axis coordinates of the position of contact of the finger with said sensor output from said sensor and to selectively output one of fingerprint pattern data and positional detection data as an input from the finger; and a controller operable to control said sensor and said processor.

2. An information processing apparatus, comprising:

a touch pad comprising:

a sensor operable to detect a fingerprint pattern of a finger, and X-axis and Y-axis coordinates of a position of contact of the finger with said sensor, wherein said sensor is an electrostatic capacity sensor or a resistance sensor;

a processor communicatively connected to said sensor in such a manner as to enable communication of information between said sensor and said processor, said processor operable to processes the fingerprint pattern and the X-axis and Y-axis coordinates of the position of contact of the finger with said sensor output from said sensor, and to selectively output one of fingerprint pattern data and positional detection data as an input from the finger; and a controller operable to control said sensor and said processor.

* * * * *